Feb. 20, 1973   C. J. ALEXANDER   3,716,916
RECIPROCATING SAW AND BLADE THEREFOR
Filed Feb. 16, 1970   2 Sheets-Sheet 1

INVENTOR.
CARL J. ALEXANDER
BY
ATTORNEY

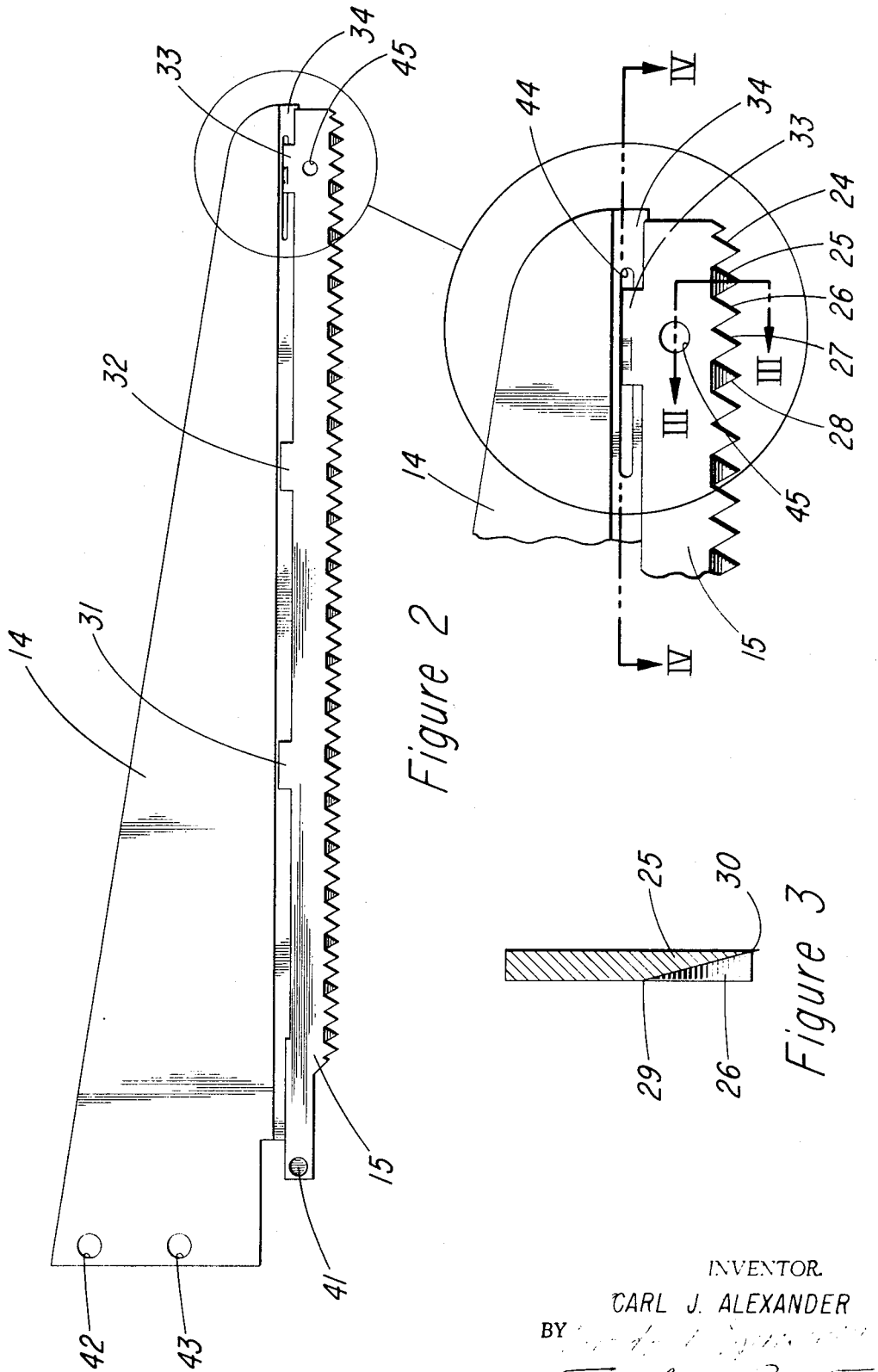

United States Patent Office 3,716,916
Patented Feb. 20, 1973

3,716,916
RECIPROCATING SAW AND BLADE THEREFOR
Carl J. Alexander, Moorepark, Mich., assignor to Wells Manufacturing Corporation, Three Rivers, Mich.
Filed Feb. 16, 1970, Ser. No. 11,723
Int. Cl. B27b *11/00*
U.S. Cl. 30—369                                                9 Claims

ABSTRACT OF THE DISCLOSURE

A power-driven reciprocating saw comprises a motor having a housing, a blade support arm secured on the housing, a saw blade bearing against the support member and having alternating raker teeth and pairs of flat bevel ground cutting teeth, and means drivingly connecting the blade with the motor so as to impart reciprocating motion to the blade.

BACKGROUND OF THE INVENTION

The present invention is an improvement of the reciprocating saw and blade disclosed in U.S. Pat. 2,784,751, and is particularly adapted for use in food processing applications. The herein disclosed blade provides efficient cutting action with a minimum of applied pressure, and can be readily cleaned and/or sterilized between successive cutting operation. Moreover, the blade is readily removable from the saw, thus the present saw provides versatility that can only be achieved with interchangeable blades and efficient operation because a dull blade can be quickly replaced thus assuring a virtually continuous availability of the saw for use.

A still further advantage that is derived from the saw blade of the present invention is that chips generated during cutting are effectively quickly removed from the kerf, thus reducing friction during the cutting operation and preventing binding of the blade.

SUMMARY OF THE INVENTION

This invention contemplates a power-driven reciprocating saw provided with a supported blade. The blade comprises an elongated metal strip provided along one longitudinal edge with alternating raker teeth and at least a pair of flat bevel ground cutting teeth. Preferably adjacent cutting teeth have opposite bevel which extends from the gullet to the point of each tooth. On the opposite longitudinal edge of the blade are provided lugs which are adapted to engage a blade support member of the saw so that the saw blade bears thereagainst during use.

BRIEF DESCRIPTION OF THE DRAWINGS

In the drawings,

FIG. 2 is a side elevation of a support member and a saw blade of this invention, with a portion thereof enlarged to show detail;

FIG. 3 is a cross-sectional view of the saw blade shown in FIG. 2 taken along line III—III.

DESCRIPTION OF THE PREFERRED EMBODIMENTS

Figure 1:
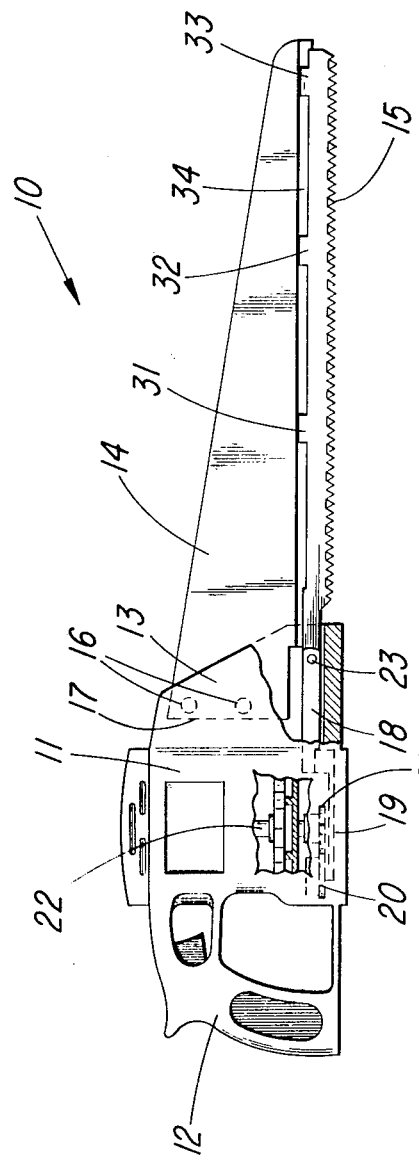
FIG. 1 is a side elevation view of the reciprocating saw of this invention, partially broken away to show detail.

Referring to FIG. 1, reciprocating saw 10 comprises a motor housing 11 provided with a handle 12 on one side thereof and an upright, outwardly projecting rib 13 on the other side thereof. Blade support member 14 is situated in slot 17 of rib 13 and projects outwardly therefrom, removably secured to rib 13 by screws 16. Blade 15 bears against support arm 14 and is reciprocated by arm 18 journaled in housing 11 near lower end of rib 13 and is connected by connecting rod 19 to crank gear 20 which is driven from gear 21 mounted on motor shaft 22. Arm 18 is removably secured to blade 15 by a suitable set screw 23 or the like.

As shown in FIG. 2, blade 15 is an elongated metal strip provided with a substantially linear cutting edge comprising a pair of cutting teeth 24 and 25 on one side of raker tooth 26 and a pair of cutting teeth 27 and 28 on the other side of raker tooth 26. All of the teeth are coplanar with blade 15 and have a substantially triangular configuration. As can be further seen from FIG. 2, the apex of each tooth lies substantially midway of the tooth, thus the substantially linear cutting edge of blade 15 can cut in both directions of movement. While all teeth on the blade can be the same length, preferably the raker teeth are somewhat shorter than the cutting teeth as shown in FIG. 3 where raker tooth 26 is shorter than cutter tooth 25. This reduces substantially the pressure necessary on blade 15 in order to make a cut. Cutter teeth 24 and 25, and also 27 and 28, are beveled on opposite sides of the tooth so as to provide a cutting line on both sides of the kerf which is then cleaned out by the raker tooth 27 that follows. A full bevel extending from the gullet 29 to the point 30 of a tooth (FIG. 3) is preferred, since this provides ample space to contain the resulting chips which are transported away from the cutting zone and out of the kerf by the reciprocating motion of blade 15; however, less than a full bevel, for example a half-bevel or a three-quarter bevel, can also be used.

As stated hereinabove, adjacent cutter teeth on each side of a raker tooth are provided with an opposite bevel. Each raker tooth must be flanked with at least a pair of cutter teeth on each side; however, three or more cutter teeth on each side can also be utilized, depending on the stroke of the blade. In the more preferred embodiment of this invention, consecutive cutter teeth are provided with an opposite bevel, i.e., the cutter teeth immediately flanking a raker tooth on each side have opposite bevels. It has been found that most effective cutting is achieved in this manner. If desired the cutter and raker teeth can be outwardly set. A conventional X-set or any other set can be utilized.

Figure 4:
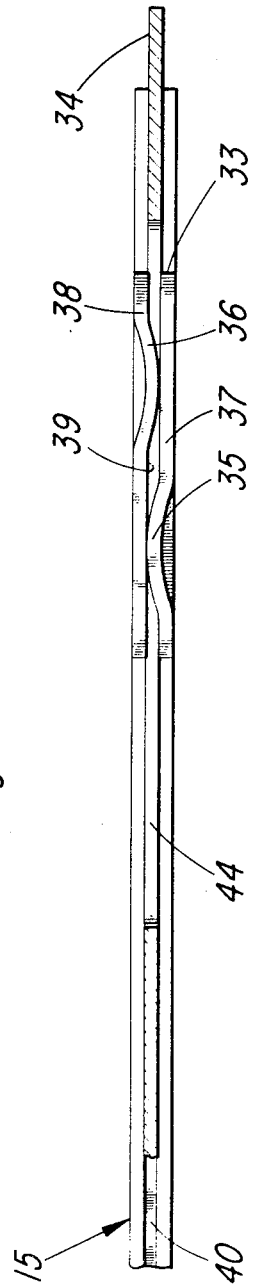
FIG. 4 is an enlarged top view of a portion of the blade shown in FIG. 2 along line IV—IV.

Lugs 31, 32 and 33 are provided substantially coplanar and integral with blade 15 on the opposite side of the teeth. The lugs are adapted to engage and lap tongue 34 of support member 14. The outermost lug 33 is preferably provided with a pair of adjacent indents 35 and 36 (FIG. 4) which are conveniently shear-formed in the upper portion of each of the upwardly projecting leafs 37 and 38 of lug 33 and are adapted to engage slot 44 of member 14. Support member 14 is received in a central slot 39 which is cut in the lugs as shown for lug 33 and tongue 34 thereof engages and bears against groove 40 which extends longitudinally along the upper edge of blade 15.

Blade 15 is connected to the drive means by setscrew 23 which is adapted to engage recess 41. Openings 42 and 43 are adapted to receive screws 16 therethrough.

Opening 45 in blade 15 is provided to receive any suitable tool for pulling the blade to its outermost position prior to removal from the saw.

The saw blade of this invention can be manufactured utilizing conventional cutting and grinding operations to achieve the desired configuration. The total number of teeth, the coarseness or fineness thereof is not critical. Blades of the present invention normally are manufactured having 8, 12, or 16 teeth per inch.

The foregoing discussion is illustrative but is not to be construed as limiting. Still other variations and rearrangements of parts within the spirit and scope of this invention will readily present themselves to the skilled artisan.

I claim:
1. A power-driven reciprocating saw comprising
a motor having a housing provided with a handle on one side and a rib on the other side thereof;
a blade support member secured in a slot in said rib and projecting outwardly therefrom, and provided with a central tongue along one longitudinal edge thereof;
a saw blade with a substantially linear cutting edge cutting in both directions of movement and including an elongated metal strip having alternating raker teeth and at least a pair of flat bevel ground cutting teeth situated along one longitudinal edge thereof and provided with a groove and outwardly projecting substantially coplanar lugs along the other longitudinal edge thereof; said tongue of the support member engaging the groove of said blade and bearing thereagainst and said lugs engaging said support member and lapping alongside the tongue thereof; and
means drivingly connecting said blade with said motor so as to impart a reciprocating motion thereto;
said raker teeth and said cutting teeth being coplanar with the blade, having a substantially triangular configuration, the apex of each tooth being situated substantially midway of the tooth, and the bevel of each cutting tooth extending from the gullet to the point of the tooth.

2. Reciprocating saw in accordance with claim 1 wherein the lugs are provided with a central slot adapted to receive said tongue and are lapping the tongue along both sides.

3. Reciprocating saw in accordance with claim 2 wherein a lug is provided with a pair of adjacent indents projecting into the central slot from opposite sides and adapted to engage a slot in said support member.

4. A reciprocating saw blade with a substantially linear cutting edge cutting in both directions of movement for a power driven saw provided with a blade support member comprising
an elongated metal strip having alternating raker teeth and at least a pair of flat bevel ground cutting teeth situated along one longitudinal edge thereof, and provided with a groove and outwardly projecting substantially coplanar lugs along the other longitudinal edge thereof adapted to engage said support member;
said raker teeth and said cutting teeth being coplanar with the blade, having a substantially triangular configuration, the apex of each tooth being situated substantially midway of the tooth, and the bevel of each cutting tooth extending from the gullet to the point of the tooth.

5. Saw blade in accordance with claim 4 wherein each raker tooth is flanked by a pair of cutting teeth and each pair of cutting teeth comprises teeth having opposite bevel.

6. Saw blade in accordance with claim 4 wherein consecutive cutting teeth have opposite bevel.

7. Saw blade in accordance with claim 4 wherein the raker teeth are shorter than the cutting teeth.

8. Saw blade in accordance with claim 4 wherein the lugs are provided with a central slot adapted to receive and lap a portion of said support member.

9. Saw blade in accordance with claim 8 wherein a lug is provided with a pair of adjacent indents projecting into the central slot from opposite sides and adapted to engage a slot in said support member.

References Cited
UNITED STATES PATENTS

| | | | |
|---|---|---|---|
| 2,895,514 | 7/1959 | Wright | 143—156 X |
| 3,181,577 | 5/1965 | Gaskins | 143—133 |
| 1,838,125 | 12/1931 | Wirtz | 143—156 X |
| 1,919,748 | 7/1933 | Roberts | 143—133 H |
| 2,573,573 | 10/1951 | Jenkins | 143—133 G X |

ANDREW R. JUHASZ, Primary Examiner

J. F. COAN, Assistant Examiner

U.S. Cl. X.R.

83—835; 30—392